US012145734B2

(12) United States Patent
Veilleux, Jr. et al.

(10) Patent No.: US 12,145,734 B2
(45) Date of Patent: Nov. 19, 2024

(54) HYBRID PROPULSION SYSTEMS

(71) Applicant: Hamilton Sundstrand Corporation, Charlotte, NC (US)

(72) Inventors: Leo J. Veilleux, Jr., Wethersfield, CT (US); Lubomir A. Ribarov, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 289 days.

(21) Appl. No.: 17/135,800

(22) Filed: Dec. 28, 2020

(65) Prior Publication Data
US 2022/0204171 A1 Jun. 30, 2022

(51) Int. Cl.
| | |
|---|---|
| *B64D 27/24* | (2024.01) |
| *B60L 50/60* | (2019.01) |
| *B64D 27/02* | (2006.01) |
| *B64D 27/10* | (2006.01) |
| *B64D 35/06* | (2006.01) |

(Continued)

(52) U.S. Cl.
CPC ............. *B64D 27/02* (2013.01); *B60L 50/60* (2019.02); *B64D 27/10* (2013.01); *B64D 27/24* (2013.01); *B64D 35/06* (2013.01); *F02C 3/04* (2013.01); *F02C 6/20* (2013.01); *F16H 57/02* (2013.01); *B60L 2200/10* (2013.01); *B60L 2210/30* (2013.01); *B64D 27/026* (2024.01); *F05D 2220/323* (2013.01); *F05D 2220/766* (2013.01);
(Continued)

(58) Field of Classification Search
CPC ... F02C 7/32; F02C 7/36; F02K 3/072; B64D 27/14; B64D 27/20
See application file for complete search history.

(56) References Cited

U.S. PATENT DOCUMENTS 4,817,382 A * 4/1989 Rudolph .................... F02C 3/10
416/129
5,867,979 A * 2/1999 Newton .................. F02C 3/113
310/90.5

(Continued)

FOREIGN PATENT DOCUMENTS

| | | |
|---|---|---|
| EP | 2562085 A2 | 2/2013 |
| EP | 3090951 A1 | 11/2016 |

(Continued)

OTHER PUBLICATIONS

Extended European Search Report issued by Examiner Mario Busto, of the European Patent Office, mailed on May 10, 2022, in corresponding European Patent Application No. 21217979.0.

(Continued)

*Primary Examiner* — Thuyhang N Nguyen

(57) ABSTRACT

A hybrid propulsion system can include a turbomachine having a compressor, a combustion chamber, and a compressor turbine. The compressor can be connected to the compressor turbine via a first shaft. The system can include a hybrid drive assembly which can include a power turbine in fluid communication with an outlet of the compressor turbine to be driven by compressor turbine exhaust to drive a second shaft that is disconnected from the first shaft. The hybrid drive assembly can also include an electrical machine mechanically coupled to the second shaft either to convert rotational energy to electrical energy or to convert electrical energy to rotational energy of the second shaft.

19 Claims, 3 Drawing Sheets

(51) Int. Cl.
*F02C 3/04* (2006.01)
*F02C 6/20* (2006.01)
*F16H 57/02* (2012.01)

(52) U.S. Cl.
CPC ............... *F05D 2260/4031* (2013.01); *F16H 2057/02043* (2013.01)

(56) References Cited

U.S. PATENT DOCUMENTS

| | | | |
|---|---|---|---|
| 8,162,611 B2 | 4/2012 | Perkinson et al. | |
| 8,701,381 B2 | 4/2014 | Eames | |
| 9,701,395 B2 | 7/2017 | Veilleux, Jr. et al. | |
| 9,835,093 B2 | 12/2017 | Golshany et al. | |
| 10,407,169 B2 | 9/2019 | Groninga et al. | |
| 11,098,678 B2 * | 8/2021 | Suciu | F02K 5/00 |
| 11,365,686 B2 * | 6/2022 | Rougier | F01D 15/10 |
| 2010/0133832 A1 * | 6/2010 | Butt | B64C 11/48 |
| | | | 290/46 |
| 2013/0045102 A1 * | 2/2013 | Gallet | F02C 7/36 |
| | | | 475/248 |
| 2017/0320584 A1 * | 11/2017 | Menheere | B64D 27/24 |
| 2018/0080378 A1 * | 3/2018 | Alecu | F02C 6/02 |
| 2018/0252161 A1 * | 9/2018 | Munevar | F02C 3/10 |
| 2019/0322382 A1 * | 10/2019 | Mackin | B64D 27/16 |
| 2020/0039657 A1 | 2/2020 | Ransom et al. | |
| 2020/0056543 A1 * | 2/2020 | Walker | F02C 7/06 |
| 2020/0247528 A1 | 8/2020 | Charier et al. | |
| 2021/0207543 A1 * | 7/2021 | Rougier | F01D 15/10 |
| 2021/0403169 A1 * | 12/2021 | Tantot | B60L 50/13 |

FOREIGN PATENT DOCUMENTS

| | | |
|---|---|---|
| EP | 3412566 A1 | 12/2018 |
| EP | 3415436 A1 | 12/2018 |
| EP | 3421366 A1 | 1/2019 |
| EP | 3680174 A1 | 7/2020 |
| IT | 20120961 | 5/2014 |

OTHER PUBLICATIONS

European Communication Pursuant to Art. 94(3) EPC, dated Nov. 2, 2023, issued during the prosecution of corresponding European Patent Application No. EP21217979.0; pages.

* cited by examiner

HYBRID PROPULSION SYSTEMS

FIELD

This disclosure relates to hybrid propulsion systems, e.g., for aircraft propulsion.

BACKGROUND

In certain aircraft architectures, advanced engines that optimize speed, fuel efficiency, and reduced (exhaust and noise) emissions may have a contra-rotating open rotor (CROR) architecture. In this configuration, typically two such engines are mounted at the aft end of the aircraft fuselage (one on each side). Each engine has a pair of contra-rotating propellers in a "pusher" propfan configuration.

The core is usually a small, efficient gas turbine engine—turbojet (or a very low-bypass turbofan) driving the pair of contra-rotating propellers. The propellers can be of the same diameter, or they can be different diameters to optimize aerodynamic efficiency. For lower noise considerations, the number of blades on each contra-rotating propeller is different ("clocked").

However, despite the listed advantages of the CROR pusher engines, there is still a significant operational challenge related to the "gas generator" portion of the CROR engine, i.e. the turbojet/low by-pass turbofan. Typically, gas turbine engines (turbojets/turbofans) are efficient at steady-state cruise flight conditions. However, their dynamic response and efficiency are rather low during transient operation (take-off/climb/step-climb/etc.). Therefore, it is desirable to improve the overall system performance of the CROR propulsor by combining steady-state gas turbine operational efficiency with rapid, accurate response to fast transients.

Such conventional methods and systems have generally been considered satisfactory for their intended purpose. However, there is still a need in the art for improved propulsion systems. The present disclosure provides a solution for this need.

SUMMARY

A hybrid propulsion system can include a turbomachine having a compressor, a combustion chamber, and a compressor turbine. The compressor can be connected to the compressor turbine via a first shaft. The system can include a hybrid drive assembly which can include a power turbine in fluid communication with an outlet of the compressor turbine to be driven by compressor turbine exhaust to drive a second shaft that is disconnected from the first shaft. The hybrid drive assembly can also include an electrical machine mechanically coupled to the second shaft either to convert rotational energy to electrical energy or to convert electrical energy to rotational energy of the second shaft.

The system can further include an electrical starter motor connected to the compressor to drive the compressor. In certain embodiments, the electrical starter motor can be electrically connected to the electrical machine to receive energy from the electrical machine to drive the electrical starter motor.

In certain embodiments, the system can include an AC/DC converter between the electrical machine and the electrical starter motor. In certain embodiments, the electrical machine and the electric motor are operatively connected to a battery system to receive electrical energy therefrom to drive the electrical machine and/or the electrical starter motor.

The second shaft can be connected to a contra-rotating open rotor (CROR) system to drive the CROR system. In certain embodiments, the CROR system can include a first rotor connected to an outer coaxial shaft, and a second rotor connected to an inner coaxial shaft. In certain embodiments, the inner coaxial shaft and the outer coaxial shaft are connected to a planetary gear box to be driven by the planetary gear box in opposite rotational directions.

The planetary gear box can be connected to the second shaft to be driven by the second shaft. The planetary gear box can be configured to reduce the speed from the second shaft to the inner coaxial shaft and to the outer coaxial shaft. In certain embodiments, the CROR system can be configured to extract ram air energy to rotate the inner coaxial shaft and the outer coaxial shaft which, through the planetary gear box, rotates the shaft to the electrical machine to provide electric power to one or more aircraft systems during emergency.

In accordance with at least one aspect of this disclosure, an aircraft can include a hybrid propulsion system. Any suitable embodiment of a hybrid propulsion system disclosed herein, e.g., as described above, is contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
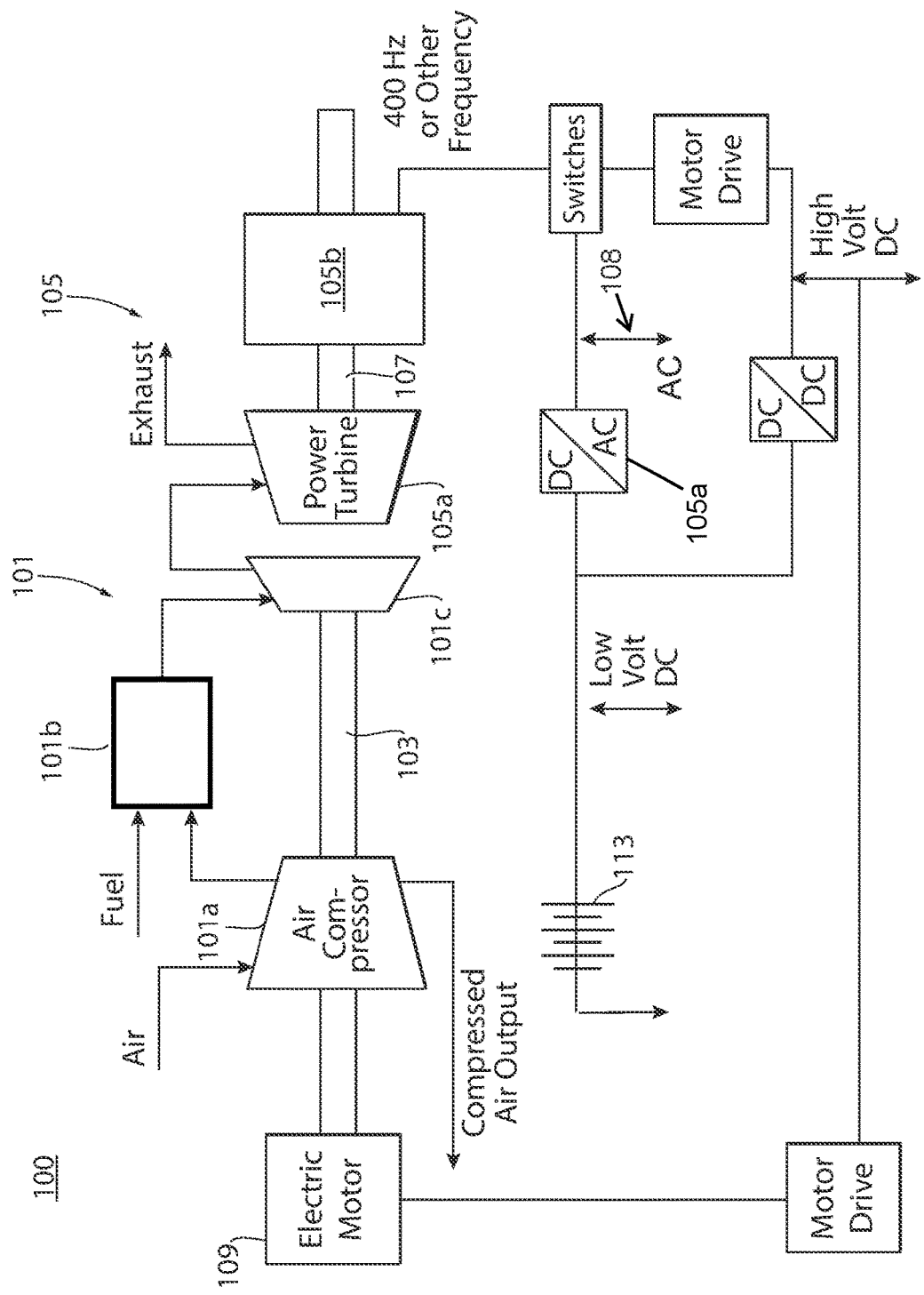
FIG. 1 is a schematic diagram of an embodiment of a hybrid propulsion system in accordance with this disclosure.
Figure 2:
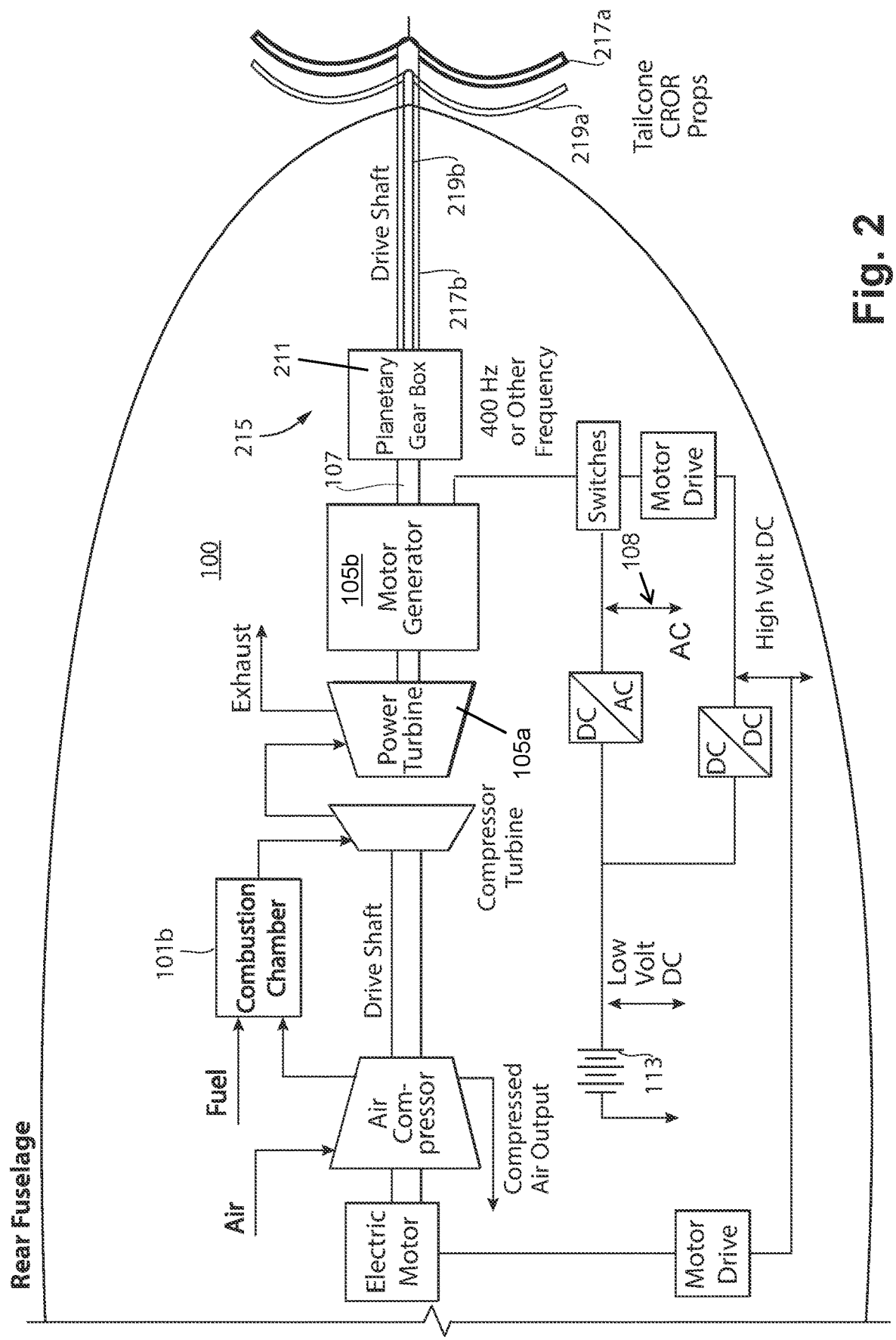
FIG. 2 is a schematic diagram of an embodiment of a system in accordance with this disclosure, shown having the embodiment of FIG. 1 and an embodiment of a contra-rotating open rotor (CROR) system connected thereto in an aircraft fuselage.
Figure 3:
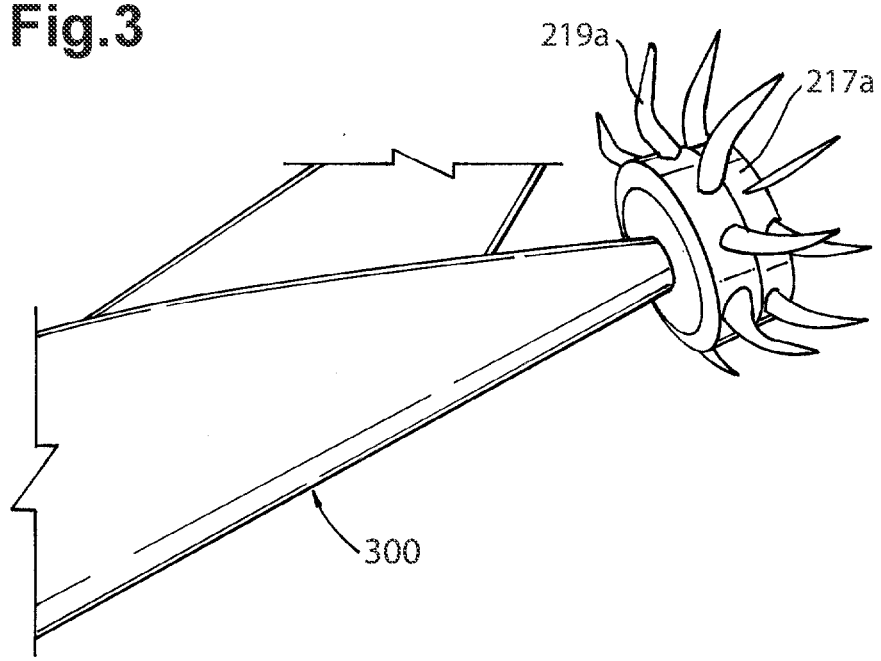
FIG. 3 is a perspective view of a portion of an aircraft having the system of FIG. 2.
Figure 4:
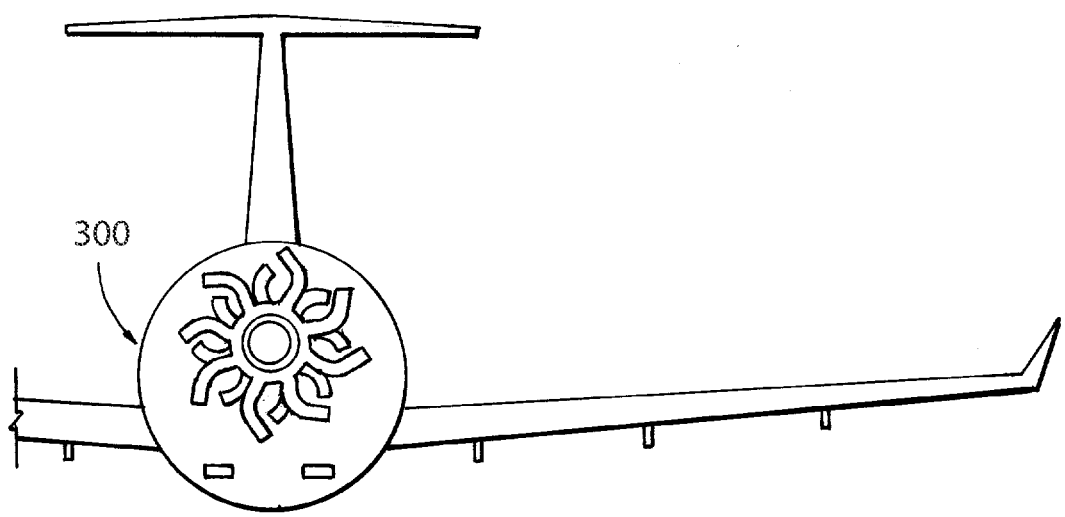
FIG. 4 is a rear view of the embodiment of FIG. 3.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-4.

Referring to FIG. 1, a hybrid propulsion system 100 can include a turbomachine 101 having a compressor 101a, a combustion chamber 101b, and a compressor turbine 101c. The compressor 101a can be connected to the compressor turbine 101c via a first shaft 103. The system 100 can include a hybrid drive assembly 105 which can include a power turbine 105a in fluid communication with an outlet of the compressor turbine 101c to be driven by compressor turbine exhaust to drive a second shaft 107 that is disconnected from the first shaft 103. The hybrid drive assembly 105 can also include an electrical machine 105b mechanically coupled to the second shaft 107 (e.g., directly) either to convert rotational energy to electrical energy or to convert electrical energy to rotational energy of the second shaft 107 (to drive the second shaft 107).

The system 100 can further include an electrical starter motor 109 connected to the compressor 101a (e.g., on shaft 103 or other suitable shaft or connection) to drive the compressor 101a (e.g., to start the turbomachine). In certain embodiments, the electrical starter motor 109 can be electrically connected to the electrical machine 105b (e.g., as shown) to receive energy (AC) from the electrical machine 105b to drive the electrical starter motor 107. An AC Bus 108 can source or sink power. When sourcing, this can source and charge the DC systems through the AC/DC converter as well as provide the power to drive the electric machine 105b with the switches open to the motor drive thereby providing the capability to both utilize AC power from the bus and drive electric machine 105b simultaneously. Such a bidirectional bus can allow both AC source and running of the electrical machine 105b as a motor, and can also allow emergency power when the tail prop is used as a rat to source AC power, for example.

In certain embodiments, the system 100 can include an AC/DC converter 111 between the electrical machine 105b and the electrical starter motor 109. This can allow direct electrical connection between the electrical machine 105b and the electric motor 109 such that when the electrical machine 105b is acting as a generator, it can provide AC energy to the electrical starter motor 109 through the AC/DC converter to provide a signal usable by the electrical starter motor 109. In certain embodiments, the electrical machine 105b and the electric starter motor 109 can be operatively connected to a battery system 113 to receive electrical energy therefrom to drive the electrical machine 105b and/or the electrical starter motor 109.

In certain embodiments, the system 100 can include a controller (not shown) configured to selectively provide electricity from the battery system 113 to the electrical machine 105b. The controller can include any suitable hardware and/or software module(s). In certain embodiments, the controller can be configured to selectively draw energy from the electrical machine 105b (e.g., to provide energy to the battery system 113 and/or to power the electrical starter motor 109 directly). In certain embodiments, the controller can be configured to monitor turbomachine speed and be configured to supply electrical energy to the electrical starter motor 109 from the battery system 113 and/or the electrical machine 105b to prevent droop. Any other suitable control scheme and/or electrical components for suitable operation (e.g., AC/DC converters, DC/DC etc.) are contemplated herein.

Any other suitable electrical components and/or construction is contemplated herein. For example, the battery can be referenced to ground, DC power can come and go on a DC bus (e.g., on a high voltage DC bus and low voltage DC bus as shown). Other sources (e.g., a fuel cell) can be on the DC bus to provide energy to run the electric machine 105b as a motor. A DC/DC converter can provide high voltage to run motor modes (e.g., enough voltage to reverse current to run electric machine as motor instead of a generator). One or more switches can be located at the electrical machine to direct and isolate (e.g., to operate as motor or generator). One or more motor drives can be used to drive the electrical machine as a motor.

Referring additionally to FIG. 2, the second shaft 107 can be connected to a contra-rotating open rotor (CROR) system 215 to drive the CROR system 215. In certain embodiments, the CROR system 215 can include a first rotor 217a connected to an outer coaxial shaft 217b, and a second rotor 219a connected to an inner coaxial shaft 219b. In certain embodiments, the inner coaxial shaft 219b and the outer coaxial shaft 217b are connected to a planetary gear box 221 to be driven by the planetary gear box 221 in opposite rotational directions (e.g., one connected to a ring gear, the other connected to a carrier of planet gears or a sun gear).

The planetary gear box 221 can be connected to the second shaft 107 to be driven by the second shaft 107. The planetary gear box 221 can be configured to reduce the speed from the second shaft 107 to the inner coaxial shaft 219b and to the outer coaxial shaft 217b, for example. In certain embodiments, the CROR system can be configured to extract ram air energy to rotate the inner coaxial shaft and the outer coaxial shaft which, through the planetary gear box, rotates the shaft to the electrical machine to provide electric power to one or more aircraft systems during emergency. The planetary gearbox 221 can be configured to increase the speed from the inner coaxial shaft 219b and from the outer coaxial shaft 217b to the second shaft 107, e.g., when the CROR system 215 is driven by ram air flow rotating the CROR rotors 219a and 217a, respectively, when rotational energy is converted to electrical energy. Any other suitable mechanical and/or geared arrangement is contemplated herein.

Referring additionally to FIGS. 3 and 4, in accordance with at least one aspect of this disclosure, an aircraft 300 can include a hybrid propulsion system. Any suitable embodiment of a hybrid propulsion system disclosed herein, e.g., as system 100 described above, is contemplated herein.

Embodiments can include a power turbine and/or electrical machine/motor that can power a propulsor. Certain embodiment can include a single shaft for the power turbine and electrical machine. This input shaft can input to the gear box and the gear box can drive two separate shafts (e.g., nested) rotating at different directions. The high speed power turbine can be connected to the sun gear and get reduced to lower speed, for example. Any suitable gearing arrangement is contemplated herein.

In certain embodiments, a large CROR propulsor ("pusher") can be located at the centerline tail cone section of the fuselage providing the main thrust power. The shaft output from the electrical machine can be provided to the CROR propulsor through a planetary gear box. The CROR propfans can be located higher off-the-centerline of the tail cone to allow safe clearance during takeoff rotation of the aircraft, for example. Any other suitable configurations are contemplated herein. Embodiments can include highly swept-back/highly curved "scimitar"-style fan blades. The advantage of using such "scimitar-style propfan blades is the delayed onset of near-sonic/sonic air flow conditions at the tips of the propfan blades. This, in turn, allows for more efficient aircraft cruising at higher operational cruise speeds. For example, the one set of blades can be mounted on a counterclockwise-turning rotor and the other blades can be mounted on a clockwise-turning rotor.

The location of the CROR propulsor at the tail cone of the aircraft can be further beneficial in utilizing the air flow form the thick fuselage-created boundary layer, thus further improving operational efficiencies by "ingesting" said boundary layer flow, resulting in a thinner, more accelerated fuselage boundary layer airflow. Reducing the thickness of the boundary layer (a major source of undesirable fuselage skin friction), while accelerating its velocity leads to improved aerodynamics (all else being equal).

In certain modes of operation, the electrical machine can produce electric power taking the gas turbine's shaft power as input. In another mode of operation, the electric power generated by electrical machine can be used to drive the CROR propulsor, for example. A direct mechanically powered drive shaft can also drive the CROR propulsor. In certain modes of operation, the CROR propulsor can be driven by both mechanical and electric power (hybrid electro-mechanical mode). In the case of loss of the turbomachine power, the thrust can be provided by electric power only driving the CROR propulsor. Or, alternatively, the CROR propulsor can run in "freewheel" mode (using ram air pressure) and provide electric power in an emergency by turning the electrical machine.

In embodiments, air can be compressed by the air compressor. The compressed air can be mixed with fuel in the combustor, the mixture ignited and burned, while the resulting hot combustion products are sent to the compressor turbine. This compressor turbine can be connected on the same shaft as the air compressor. Due to this compact/lightweight design, very high operational rotational speeds can be obtained. This can improve operational efficiency while keeping the overall weight/size to a minimum. The hot exhaust of this compressor turbine can flow to the power turbine. The gas turbine can be designed for hydrocarbon fuel or hydrogen fuel, for example. In the hydrogen fuel version, for example, the system can be highly environmentally friendly. Furthermore, the (cold liquified) hydrogen can be used as an effective on-board coolant (especially for various electric heat loads) prior to being heated/vaporized and burned as fuel in the gas turbine combustor (101*b*).

The variable-speed single-shaft power turbine ("free turbine") can be connected rigidly (e.g., via a second shaft) to the electric machine (which can act as a motor/generator). The power turbine can extract the power form the expanded exhaust gases downstream of the compressor turbine for example.

The power turbine's shaft can be connected to the electrical machine which can be a standard wound-field synchronous generator/motor or other any other suitable type, e.g., induction, permanent magnet, or switched-reluctance generators. The compressor drive shaft can be coupled mechanically to an inverter-fed electric starter motor, for example, and a portion of the electrical machine power can be absorbed by a power converter. A solid-state power AC-AC converter can control the electric motor speed of the electric starter motor. The AC-AC solid-state power converter can be a VF-CF (Variable Frequency-Constant Frequency) power converter. Alternatively, the AC-AC solid state power converter can be any other suitable architecture. By assisting the air compressor with the electric starter motor, the hybrid-electric system can be able to increase the power output of the compressor turbine when necessary. This, in turn increases the power output of the power ("free") turbine. As a result, more output power is provided to the electrical machine.

The electrical machine can provide electric power for propulsion as well as shaft power to drive an associated CROR propulsor in the tail cone. In addition, the electric power from the electrical machine can flow through an AC/DC solid-state converter to the electric motor (in front of the air compressor). This electric starter motor can be used as a starter (reversed electric power flow) during initial engine start. Both induction and permanent magnet brushless motor can be used as inverter-fed electric motor coupled mechanically with the air compressor shaft. Any additional electric power generated by the electrical machine which is not immediately needed/consumed can be stored in aircraft's on-board batteries. Additional compressed air bleed can also be provided from the air compressor (as needed) to any pneumatic/hybrid (electro-pneumatic) systems on-board the aircraft. In addition, a portion of the compressed air bleed may be used for cooling of electric motor 109, electric motor generator 105*b*, as well as various associated components (switches, motor drives, solid-state power converters (AC/DC, DC/DC), etc.) as shown in FIG. 1. The number, location, and sizing of the air compressor "bleed" ports can be selected in a manner so that it optimizes the overall performance of the proposed hybrid propulsion system.

Embodiments can quickly follow the load variation, in seconds instead of in minutes, because the time constant of the motor torque control can be a fraction of second. Direct connection of a high-speed electric starter motor to the compressor shaft can be better than using an electric motor with step-up gear train.

Embodiments enable use of a gas turbine with a power turbine and a generator/motor. Embodiments can be started with a motor run by electric energy source. The gas turbine can drive a power turbine output which can drive a contra-rotating fan. Energy can be added or absorbed by a generator motor on power turbine output allowing power to shift from 100% gas turbine to 100% electric or a combination of both depending on the flight needs, flight plan, mission profile, electric energy demands, electric energy supply, and the system health. The system can also absorb aerodynamic energy to create electric energy in case of loss of all propulsion power (i.e., emergency power mode) and electric energy to create electrical energy to sustain flight controls and essential electronics. Embodiments can support quiet operation (e.g., low NVH (Noise, Vibration, Harshness)) with electric mode.

Benefits of certain embodiments include a capability for independent operation of the CROR propulsor on only mechanical (shaft) power, or only electrical, or combined (hybrid) electro-mechanical, a capability to "freewheel" the CROR props of a "failed" propulsor in a "RAT"-style mode to help turn electric motor and provide emergency electric power, a compact EM-driven contra-rotating PM motor-driven rotary propulsion system, fast response to sudden fluctuation (fast transients) in load, electric motor can increase the rotation speed and compensate for the power drop (e.g., at high ambient temperature when the output of gas turbine decreases), and lower weight and smaller volume envelope (minimum number of parts) compared to using an additional battery or a separate flywheel, high power-density electric motor can provide high propulsive force/torque (through reduction gearboxes). Sensors such as electric load or mechanical torque, can detect electric machine energy and provide energy controller adjustments to rapidly compensate for changes. Alternatively external system digital data can provide a priori information on anticipated changes in energy demands.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A hybrid propulsion system, comprising:
   a turbomachine disposed within a fuselage, the turbomachine comprising:
   a compressor;
   a combustion chamber; and
   a compressor turbine, wherein the compressor is connected to the compressor turbine via a first shaft;
   a hybrid drive assembly, comprising:
   a power turbine in fluid communication with an outlet of the compressor turbine to be driven by compressor turbine exhaust to drive a second shaft that is mechanically disconnected from the first shaft continuously during operation of the hybrid propulsion system;
   an electrical machine mechanically coupled to the second shaft either to convert rotational energy to electrical energy or to convert electrical energy to rotational energy of the second shaft; and
   an electrical starter motor, wherein the electrical starter motor is connected to the compressor on the first shaft, wherein the electrical starter motor is electrically connected to the electrical machine to receive energy from the electrical machine to drive the electrical starter motor,
   wherein the second shaft connects to a propulsor at an aft end of the fuselage to drive the propulsor.

2. The system of claim 1, further comprising an AC/DC converter between the electrical machine and the electrical starter motor.

3. The system of claim 2, wherein the electrical machine and the electrical starter motor are operatively connected to a battery system to receive electrical energy therefrom to drive the electrical machine and/or the electrical starter motor.

4. The system of claim 1, wherein the propulsor includes a contra-rotating open rotor (CROR) system to drive the CROR system.

5. The system of claim 4, wherein the CROR system includes a first rotor connected to an outer coaxial shaft, and a second rotor connected to an inner coaxial shaft.

6. The system of claim 5, wherein the inner coaxial shaft and the outer coaxial shaft are connected to a planetary gear box to be driven by the planetary gear box in opposite rotational directions.

7. The system of claim 6, wherein the planetary gear box is connected to the second shaft to be driven by the second shaft.

8. The system of claim 7, wherein the planetary gear box reduces a speed from the second shaft to the inner coaxial shaft and to the outer coaxial shaft.

9. An aircraft, comprising:
   a hybrid propulsion system, comprising:
   a turbomachine disposed within a fuselage, the turbomachine comprising:
   a compressor;
   a combustion chamber; and
   a compressor turbine, wherein the compressor is connected to the compressor turbine via a first shaft;
   a hybrid drive assembly, comprising:
   a power turbine in fluid communication with an outlet of the compressor turbine to be driven by compressor turbine exhaust to drive a second shaft that is mechanically disconnected from the first shaft continuously during operation of the hybrid propulsion system;
   an electrical machine mechanically coupled to the second shaft either to convert rotational energy to electrical energy or to convert electrical energy to rotational energy of the second shaft; and
   an electrical starter motor, wherein the electrical starter motor is connected to the compressor on the first shaft, wherein the electrical starter motor is electrically connected to the electrical machine to receive energy from the electrical machine to drive the electrical starter motor,
   wherein the second shaft connects to a propulsor at an aft end of the aircraft to drive the propulsor.

10. The aircraft of claim 9, wherein the hybrid propulsion system further includes an AC/DC converter between the electrical machine and the electrical starter motor.

11. The aircraft of claim 10, wherein the electrical machine and the electrical starter motor are operatively connected to a battery system to receive electrical energy therefrom to drive the electrical machine and/or the electrical starter motor.

12. The aircraft of claim 9, wherein the propulsor includes a contra-rotating open rotor (CROR) system to drive the CROR system.

13. The aircraft of claim 12, wherein the CROR system includes a first rotor connected to an outer coaxial shaft, and a second rotor connected to an inner coaxial shaft.

14. The aircraft of claim 13, wherein the inner coaxial shaft and the outer coaxial shaft are connected to a planetary gear box to be driven by the planetary gear box in opposite rotational directions.

15. The aircraft of claim 14, wherein the planetary gear box is connected to the second shaft to be driven by the second shaft.

16. The aircraft of claim 15, wherein the planetary gear box reduces a speed from the second shaft to the inner coaxial shaft and to the outer coaxial shaft.

17. A hybrid propulsion system for use in an aircraft fuselage, comprising:
   a turbomachine disposed within the aircraft fuselage, the turbomachine comprising:
   a compressor;
   a combustion chamber; and
   a compressor turbine, wherein the compressor is connected to the compressor turbine via a first shaft;
   a hybrid drive assembly, comprising:
   a power turbine in fluid communication with an outlet of the compressor turbine to be driven by compressor turbine exhaust to drive a second shaft that is mechanically disconnected from the first shaft continuously during operation of the hybrid propulsion system;

an electrical machine mechanically coupled to the second shaft either to convert rotational energy to electrical energy or to convert electrical energy to rotational energy of the second shaft;

an electrical starter motor, wherein the electrical starter motor is connected to the compressor on the first shaft, wherein the electrical starter motor is directly electrically connected to the electrical machine to receive energy from the electrical machine to drive the electrical starter motor;

a planetary gear box connected to the electrical machine on the second shaft; and two coaxial shafts, directly connected to the planetary gear box and connected to respective propulsors, to drive the respective propulsors at an aft end of the aircraft fuselage.

18. The hybrid propulsion system of claim 17, wherein the respective propulsors include propellers.

19. The hybrid propulsion system of claim 17, further comprising a controller, wherein the controller is configured to selectively draw energy from the electrical machine, wherein the controller is configured to monitor turbomachine speed and supply electrical energy to the electrical starter motor from the electrical machine to prevent droop.

* * * * *